United States Patent
Strömbergson et al.

(10) Patent No.: US 6,807,621 B2
(45) Date of Patent: Oct. 19, 2004

(54) PIPELINED MICROPROCESSOR AND A METHOD RELATING THERETO

(75) Inventors: Joachim Strömbergson, Göteborg (SE); Magnus Carlsson, Kållered (SE); Jonas Vasell, Göteborg (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 581 days.

(21) Appl. No.: 09/965,961

(22) Filed: Sep. 27, 2001

(65) Prior Publication Data

US 2002/0038417 A1 Mar. 28, 2002

(51) Int. Cl.$^7$ .................................................. G06F 9/38
(52) U.S. Cl. ........................................ 712/23; 712/244
(58) Field of Search ................... 712/244, 23

(56) References Cited

U.S. PATENT DOCUMENTS

| | | | |
|---|---|---|---|
| 5,293,592 A | * | 3/1994 | Fu et al. ................ 712/210 |
| 5,740,391 A | | 4/1998 | Hunt |
| 5,812,839 A | | 9/1998 | Hoyt et al. |
| 5,822,602 A | * | 10/1998 | Thusoo ........................ 712/1 |
| 6,026,477 A | | 2/2000 | Kyker et al. |
| 6,088,793 A | | 7/2000 | Liu et al. |
| 6,510,508 B1 | * | 1/2003 | Zuraski et al. ............ 711/207 |
| 6,550,002 B1 | * | 4/2003 | Davidson et al. ......... 712/216 |

FOREIGN PATENT DOCUMENTS

EP        0 686 914 A2     12/1995

* cited by examiner

Primary Examiner—Eric Coleman

(57) ABSTRACT

A pipelined microprocessor for processing instructions includes at least one pipeline. The pipeline includes and instruction fetching functional stage, an instruction decoding functional stage, an execution functional stage comprising a number of execution units and a commit functional stage. The commit functional stage includes or is associated with a reorder buffer. Detecting means are provided for detecting instruction irregularities. When an instruction irregularity is detected, an irregularity indication and a flush instruction are generated. The irregularity indication is used to initiate a flush made whereas the flush instruction, when received in a stage or unit set in flush mode, resets the flush mode in said stage/unit.

37 Claims, 12 Drawing Sheets

PIPELINED MICROPROCESSOR AND A METHOD RELATING THERETO

This application claims priority under 35 U.S.C. §§119 and/or 365 to Application No. 0003446-2 filed in Sweden on Sep. 27, 2000; the entire content of which is hereby incorporated by reference.

TECHNICAL FIELD

The present invention relates to the field of pipelined microprocessors and particularly to a pipelined microprocessor capable of handling instruction irregularities such as exceptions, interrupts and branch mispredictions and to a method of handling instruction irregularities in a pipelined microprocessor.

STATE OF THE ART

So called pipelined processors have been developed to speed up the processing speed of computer processors and to improve or increase the instruction flow through a microprocessor. A pipelined processor includes a plurality of independently operating stages. When a first instruction has been handled in one of the pipeline stages, it is moved on to the next stage whereas a subsequent instruction is received in the stage that a preceding instruction just left. Generally several instructions are processed simultaneously in the pipeline since each stage may bold an instruction. So called super-scalar processors are also known which comprise multiple pipelines processing instructions simultaneously when adjacent instructions have no data dependencies between them. A super-scalar processor commits more than one instruction per cycle. Through the provision of out-of-order processors an even higher degree of parallellism and a higher performance can be provided for. An out-of-order processor includes multiple parallell stages/units in which instructions are processed in parallell in any efficient order taking advantage of parallell processing. Out-of-order processing is much more complex than conventional processing among others due to the need of state recovery following unpredicted changes in the instruction flow.

Microprocessors may implement the technique of overlapping a fetching stage, a decoding stage, an execution stage and possibly a write back stage. In a so called deeply pipelined microprocessor each processing stage is divided into sub-stages to still further increase the performance.

Generally state recovery mechanisms are introduced in order to provide for state recovery following an exception, an interrupt or a branch misprediction which in the present application are gathered under a common concept of instruction irregularity.

Exceptions are generally unexpected events associated with the instructions such as page fault and memory accesses, data break point traps or divided-by-zero conditions.

Interrupts are events occurring from outside of the processor that may be initiated for example by the devices coupled to the same buses or processors.

A branch instruction is an instruction that expressly changes the flow of program. Branch instructions may be conditional or unconditional. An unconditional branch instruction is always taken whereas a conditional branch instruction either is taken or not taken depending on the results of the condition expressed within the instruction. Conditional branch instructions within an instruction stream generally prevent the instruction fetching stage from fetching subsequent instructions until the branch condition is fully resolved.

In a pipelined microprocessor a conditional branch instruction will not be fully resolved until it reaches an instruction execution stage close to the end of the pipeline. The instruction fetching stage will then stall because the unresolved branch condition prevents the instruction fetching stage from knowing which instructions to fetch next. This is clearly disadvantageous.

Therefore it is known to implement various branch prediction mechanisms to predict the outcome of a branch instruction. The instruction fetching stage then uses the branch predictions to fetch subsequent instructions. Therethrough it is not necessary to wait until the branch instruction has been fully resolved.

If a branch prediction has made a correct prediction, the processing of instructions is not affected. If however the mechanism has mispredicted the branch, the instruction pipeline has to be flushed and execution is to be restarted at the corrected address. It is therefore desirable to detect and correct a branch misprediction as early as possible, particularly for deeply pipelined processors where a long pipeline needs to be flushed each time a misprediction is made.

U.S. Pat. No. 5,812,839 suggests a solution to this problem through using a four stage branch instruction resolution system. A first stage predicts the existence and outcome of branch instructions within an instruction stream such that an instruction fetching stage continually can fetch instructions. The second stage decodes all the instructions fetched. If the decode stage determines that a supposed branch instruction predicted by the first stage is not actually a branch instruction, the decode stage flushes the pipeline and restarts the processor at a corrected address. The decode stage verifies all branch predictions made by the branch prediction stage. The decode stage makes branch predictions for branches not predicted by the branch prediction stage. A third stage executes the branch instructions to determine a final branch outcome and a final branch target address. The branch execution stage compares the final branch outcome and the final branch target address with the prediction to determine if the processor has to flush the front-end of the microprocessor pipeline and restart again at a corrected address. The final branch resolution stage retires all branch instructions ensuring that any instructions fetched after a mispredicted branch are not committed into permanent state. It is clearly disadvantageous that the whole front-end needs to be flushed if there has been a misprediction.

It is also a serious drawback in all known pipelined microprocessors, implementing speculative prediction, that at several different locations and stages a part of the information has to be disposed of. All data belonging to the instructions after a mispredicted branch need to be flushed. The more steps the pipeline contains, the more serious the problem will be since larger memories and longer queues have to be searched in order to find the data that is to be disposed of. This of course seriously affects the performance.

SUMMARY OF THE INVENTION

What is needed is therefore a pipelined microprocessor capable of handling instruction irregularities, such as one or more of exceptions, interrupts and branch mispredictions, in a more efficient manner compared to hitherto known pipelined processors. Particularly a pipelined microprocessor is needed through which instruction irregularities can be handled in an efficient manner with a minimum of performance reduction, compared to the situation when there is no instruction irregularity. Further a pipelined microprocessor is needed through which invalid instructions associated with an instruction irregularity can be handled as efficiently as possible. Particularly a pipelined processor is needed through which branch mispredictions to a minimum extent affect execution and through which no flushing is needed in those execution units that are not handling a branch misprediction.

Particularly a pipelined microprocessor that implements speculative execution is needed, through which mispredicted branch instructions do not require flushing of the front-end with a corresponding restart when a mispredicted branch instruction is detected.

In addition to a pipelined microprocessor, a method of handling instruction irregularities, and through which one or more above mentioned objects can be fulfilled, is also needed.

In the present application the concept functional stage is introduced to indicate that the functionality referred to may be provided in one or more separate "sub"-stages providing the same functionality, or more than one functionality may be provided in a combined stage. As an example the "conventional" decoding stage could be provided in more than one stage; this is of course applicable to any one of the functional stages. Alternatively two or more functional stages could be provided in a combined stage etc. When referring to a stage in the present application is generally meant a functional stage. The invention therefore provides a microprocessor for processing instructions, comprising at least one pipeline which comprises; an instruction fetching functional stage; an instruction decoding functional stage; an execution functional stage, comprising one or more execution units; and a commit functional stage comprising or being associated with a reorder buffer.

Means are also provided for detecting instruction irregularities e.g. at the execution functional stage (or at the commit functional stage), such that when an instruction irregularity is detected, an irregularity indication is generated to initiate a flush mode and to indicate the provision of a flush instruction. In an advantageous implementation the irregularity indication comprises an irregularity indication signal. However, also other ways of providing an indication are of course possible.

In one implementation the execution unit that handles the instruction irregularity generates the irregularity indication (signal). The flush instruction may particularly be provided from the instruction fetching functional stage.

The irregularity indication signal puts at least the execution unit handling the irregularity in the execution functional stage, into flush mode. In advantageous implementations it also puts the decoding functional stage in flush mode. Further, the instruction that caused the irregularity may by well-known measures be marked as causing the irregularity. The commit functional stage is then put into flush mode when said marked instruction is committed. Alternatively the irregularity indication (signal) puts at least the commit functional stage in flush mode. It may then be generated in the commit functional stage. Then, preferably, but not necessary, also all execution units of the execution functional stage are set in flush mode.

All instructions that are processed by a functional stage or a unit in flush mode are provided with a cancel marking. Particularly, all instructions processed in the decoding functional stage, and in the execution unit handling the instruction irregularity, are provided with a cancel marking. However, instructions processed in other execution units are not marked at least unless the irregularity is detected at the commit stage, An execution unit handling an instruction irregularity is in the following denoted a specific execution unit, whereas a dedicated execution unit is taken to mean an execution unit taking care of branch instructions, as will be further described below.

If an instruction has not been canceled marked in earlier (functional) stages or units of the pipelined microprocessor, the instruction is provided with a cancel marking when processed by the commit stage in flush mode. It is then to be noted that all instructions handled in the decoding functional stage, or in the specific execution unit handling the instruction irregularity, are canceled marked in that stage or unit during flush mode.

The flush instruction should at least be provided to the specific execution unit handling the instruction irregularity. In implementations in which the decoding stage is set in flush mode, the flush instruction is preferably also provided to the decoding stage, i.e. it is input to the pipeline before, or at, the decoding functional stage. The flush instruction is otherwise processed in an ordinary manner throughout the stages. However, upon arrival at functional stages or units in flush mode the flush instruction will reset the flush mode for that stage or unit. Especially, the flush instruction will reset the specific execution unit handling the instruction irregularity.

It is also to be noted that during flush mode particularly no command is issued to external units from the specific execution unit handling an instruction irregularity.

The pipelined microprocessor is particularly a deeply pipelined processor and in one particular implementation it is capable of handling instruction irregularities, e.g. exceptions and/or interrupts. Even more particularly it is capable of handling instruction irregularities comprising branch instructions. The inventive concept thus covers microprocessors able to handle one or more of branch (mis) predictions, exceptions and interrupts in a most efficient way.

Particularly the microprocessor is a speculative out-of-order processor implementing branch prediction, e.g. predicting whether a conditional branch or jump is to be taken or not. In a specific embodiment there are (one or more) dedicated execution units that are used for handling branch or jump instructions. These units may of course also handle other types of instructions in addition to branch instructions. However, the main thing is that all branch instructions are checked for instruction irregularity in the same order as they were provided to the decoding functional stage. One way to accomplish this is to provide a reservation functional stage, with a reservation unit, which precedes the dedicated execution unit and in which the branch instructions are handled in order. The concept dedicated execution unit is here merely introduced for reasons of clarity and it means an execution unit to which branch instructions may be directed. This is not introduced for limitative purposes; branch instructions may be directed to one or more execution units, dedicated (here) execution units may handle other instructions as well.

A conditional branch or jump is particularly predicted in the instruction fetching functional stage. To establish if the prediction was correct or not, information about the final outcome of the prediction is particularly provided from the execution unit handling the predicted branch instruction to detecting means. Particularly, said (dedicated) execution unit comprises the detecting means. Alternatively, said means may be located outside the pipeline, notifying the execution unit of an instruction irregularity. The detecting means may also be provided in, or in association with, the fetching functional stage.

If the prediction was correct, a response with information about it is returned to said dedicated execution unit from the detecting means. If the prediction was incorrect, a response that will generate an irregularity indication (signal) and a flush instruction is returned from the detecting means to said dedicated (specific) execution unit.

In an alternative implementation no response is provided if the prediction was incorrect, but an irregularity indication (signal) is generated. The irregularity indication (signal) is, according to one embodiment, sent from the execution unit handling the mispredicted branch instruction. Alternatively it is sent from the detecting means wherever they are located, as discussed above. In a particular implementation the irregularity indication comprises a 1-bit signal. The flush instruction is preferably generated in the decoding functional stage, but it may be generated elsewhere, e.g. in the fetching functional stage or externally of the pipeline.

In a particular implementation the detecting means are provided in, or in association with, the commit functional stage. In addition to the pipelined microprocessor, discussed above, the invention also provides a method for handling instruction irregularities, e.g. exceptions, interrupts, mispredicted branch instructions, in a microprocessor, comprising at least one pipeline which comprises an instruction fetching functional stage, an instruction decoding functional stage, an execution functional stage and a commit functional stage.

The method comprises the steps of; detecting an instruction irregularity by detecting means; providing an irregularity indication; putting at least the (specific) execution unit handling the instruction irregularity into flush mode; generating a flush instruction; inputting the flush instruction to the pipeline; cancel marking instructions during the flush mode; directing the flush instruction to said specific execution unit; and resetting the flush mode in each functional stage or unit in flush mode upon reception or handling of the flush instruction. Particularly the method includes the step of; marking the instruction causing the irregularity when detecting the instruction irregularity.

Particularly the steps of detecting an instruction irregularity comprises; predicting if an instruction might cause an irregularity; attaching the result of the predicted outcome to said instruction so that the result follows the instruction through the pipeline; processing of the instruction in an execution unit to evaluate if the instruction actually caused an irregularity; detecting if the prediction was correct; if the prediction was correct the processing is continued as normal, otherwise an irregularity indication (signal) is generated to indicate the provision of the flush instruction and to initiate the flush mode.

Particularly, it is advantageous if the specific execution unit that handles the instruction irregularity also generates the irregularity indication (signal).

Particularly, the irregularity indication (signal) puts the decoding functional stage, and the execution unit handling the irregularity in the execution functional stage, into flush mode Further, the instruction that caused the irregularity is by well-known measures marked as causing the irregularity. The commit functional stage is then put into flush mode when said marked instruction is committed.

Particularly, all instructions that are processed by a stage or unit in flush mode are provided with a cancel marking Particularly, all instructions processed in the decoding functional stage, and in the execution unit handling the instruction irregularity, are provided with a cancel marking. If an instruction has not been canceled marked in earlier functional stages or units of the pipelined microprocessor, the instruction is provided with a cancel marking when processed by the commit functional stage in flush mode. Alternatively the method comprises the step of detecting an instruction irregularity at the commit functional stage. An irregularity indication is then generated which is used to set at least the commit functional stage in flush mode. Preferably it is also used to set the entire execution functional stage in flush mode.

According to the invention may an indication, e.g. a cancel marking, be set as an irregularity is detected, and fetching of the correct code, or instruction, is immediately initiated from the appropriate location or "source". This is clearly advantageous e.g. as far as the performance is concerned. It is not necessary to explicitely and physically remove all instructions from e.g. the reorder buffer, reservation stage etc. at the same time, particularly between the execution and commit stages and between the fetching and issuance stages. The flush mode could even be implemented as a step of going through instructions without executing them, i.e. ignoring them. According to the invention it is not necessary to quickly send the flush indication through the whole pipeline. Furthermore it is not necessary to search for all instructions in order to cancel mark them. Instead a "mode" is set which cancels all passing instructions until the flush instruction arrives.

Particularly flush mode means that, all incoming or passing instructions are ignored. The first indication that flash mode should be set, e.g. the first cancel marking, indicates that the flush mode is to be set (ignoring instructions). Subsequent cancel markings has a different meaning, i.e. simply that the instructions should be ignored. In one implementation cancel marking is not required when a unit/stage is in flush mode since then this will be done by the commit stage.

It is an advantage of the invention that the front-end of the pipeline does not need to be flushed and that execution can be proceeded almost unaffected when for example a mispredicted branch instruction is detected. It is also an advantage that there is no need to search for every particular location in queues, storing means etc. to just flush the data that becomes invalid due to the instruction irregularity. If a branch instruction is mispredicted there is actually no conventional flushing at all, but the instructions can be said to be committed as canceled marked, i.e. such instructions do not cause any further processing. As soon as an instruction irregularity or particularly a mispredicted branch instruction is detected, the correct instruction is input to the instruction fetching functional stage directly after the flush instruction and all the following instructions are processed in a normal manner. Consequently, all the following instructions will be carried out orderly once the flush mode has been reset by the flush instruction. It is an advantage of the invention that restart of the fetching of instructions is possible directly when an instruction irregularity has been detected e.g. in the execution stage.

BRIEF DESCRIPTION OF THE DRAWINGS

The invention will in the following be further described in a non-limiting manner and with reference to the accompanying drawings in which.

DETAILED DESCRIPTION OF THE INVENTION

Figure 1:
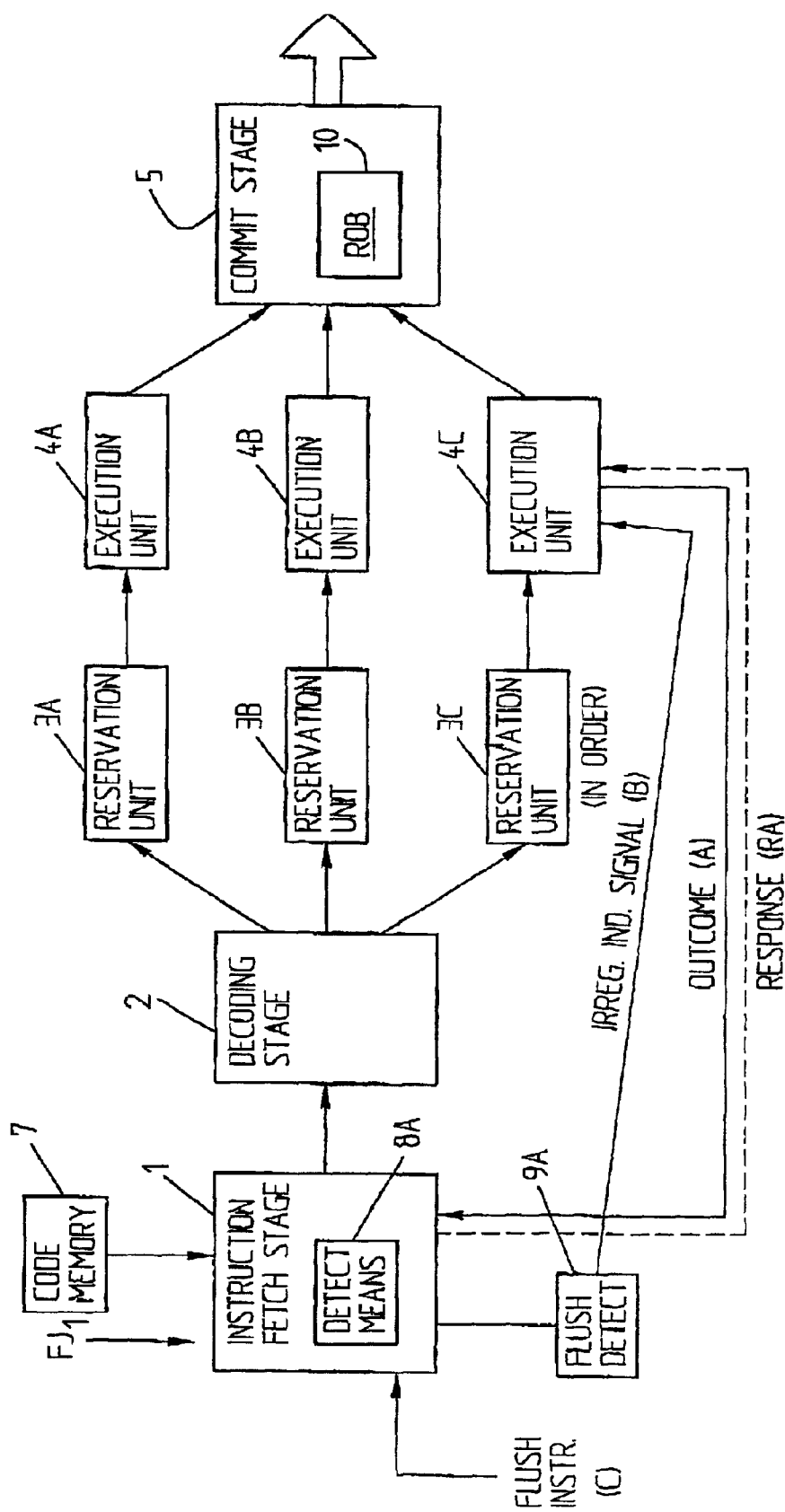
FIG. 1 is a block diagram of a pipelined microprocessor according to a first embodiment of the invention.

In FIG. 1 the main stages of a pipelined microprocessor according to one embodiment of the present invention are illustrated. In a deeply pipelined processor, the major stages such as fetch, decode and execute are divided into several substages such that each main stage in turn also is pipelined. This is however not illustrated herein for reasons of clarity and since it generally has no bearing on the inventive concept even if the gain will be even larger for such a processor. It is also referred to the concept functional stage as referred to earlier in the application indicating that a stage can be divided into a number of separate substages, or be combined with other stages (having another functionality). However, in the following is merely referred to stages although it should be understood that the concept covers functional stages. The first main stage comprises an instruction fetching stage 1 in which new instructions continuously are fetched for the instruction pipeline. In the decoding stage 2, in which a decoding unit is provided, the instructions are decoded, and particularly instructions in microcode are fetched by the instruction fetching stage 1 from the code memory 7. At the decoding stage 2 the fetched instructions are decoded, the type of each instruction is determined, etc. The instructions are either decoded in order or not.

The decoded instructions are then directed towards the appropriate reservation units from where they are forwarded to the appropriate execution units 4A, 4B, 4C of the execution stage. In this embodiment there is provided a reservation unit 3A, 3B, 3C for each execution unit 4A, 4B, 4C and instructions may be directed to execution units depending on type. In the shown embodiment a commit stage 5 follows upon the execution stage from which executed instructions are provided. Between the execution stage and the commit stage a so called write back stage may be provided, this is however not illustrated herein for reasons of clarity and it is also not necessary for the functioning of the present invention. Such a stage may however be provided in alternative implementations.

The procedure when a conditional branch (jump) instruction $FJ_1$ is fetched by the instructions fetching stage 1 will in the following be described with reference to FIG. 1. It is supposed that instruction fetching stage 1 fetches the instruction from code memory 7 and that it is a microcode instruction. In the decoding stage 2 it is established that $FJ_1$ is a conditional branch instruction. It is supposed that all branch instructions are handled by execution unit 4C, therefore $FJ_1$ is sent, after decoding, to reservation unit 3C in which branch instructions are provided in order. It is supposed that a speculative branch prediction was performed in the instruction fetching stage 1 through using any appropriate branch prediction method e.g. using history data or similar and the target address is predicted.

$FJ_1$ is output to execution unit 4C and from the execution unit 4C information about the outcome (of the prediction) is sent to the instruction fetching stage 1, i.e. outcome A in the figure. In the instruction fetching stage 1 detecting means e.g. in the form of comparing means are provided for comparing the outcome of the prediction with the actual or the calculated branch address. If the prediction was correct, a response (RA) is returned to execution unit 4C which then knows that the prediction was correct and proceeds with execution, delivering instructions to the commit stage 5 just as the other execution units 4A, 4B do. The commit stage 5 comprises a reorder buffer ROB 10 for reordering the executed instructions which, since they are executed in different execution units, arrive in a disordered manner. In ROB 10 the instructions are again reordered, and finally committed and output.

If, however, the comparing means 8A (or more generally instruction irregularity detecting means) in the instruction fetching stage 1 established that the predicted outcome was not correct, no response is provided to execution unit 4C, but instead a flush instruction is generated. This may be done in the instruction fetching stage or in separate means, the main thing being that a flush instruction is generated somewhere. Flush detecting/decoding means 9A are also provided for detecting that a flush instruction has been generated and said means, or some other means, sends an irregularity indication signal (B) substantially directly to the execution unit 4C to set it in flush mode. The irregularity indication signal may also be generated substantially parallelly with, but independently from, the generation of the flush instruction upon detecting the misprediction; then the flush detecting means 9A are not needed.

Substantially at the same time the generated flush instruction is fetched by the instruction fetching stage, or, generated by the instruction fetching means, and processed as a conventional instruction through the pipeline wherein it is decoded at the decoding stage 2 and directed towards the execution unit 4C handling branch instructions. When this flush instruction (C) is received in the execution unit 4C, the flush mode is reset. During flush mode, all subsequent instructions received in execution unit 4C are canceled marked. This is possible since they are provided in order in the reservation unit 3C. Actually the main thing is that the instructions are checked for an irregularity in order. One way to obtain this is through providing them in order in a reservation unit. The canceled marked instructions are then provided to the commit stage 5 which receives and commits the canceled marked instructions.

The other execution units 4A, 4B continue to execute instructions without being affected by what is going on in execution unit 4C; i.e. that it is in flush mode. However, when such instructions from for example execution units 4A, 4B handled during the flush mode of execution unit 4C, arrive at the commit stage 5, also such instructions are canceled marked. This is however not performed until they are received in the commit stages, which means that execution proceeds normally. When the flush instruction is received in the commit stage and normal committing is resumed, i.e. subsequent instructions from the execution units 4A, 4B are riot canceled marked. The commit stage comprises, as referred to above, a reorder buffer ROB 10 in which the instructions again are provided in order which makes it possible to cancel mark instructions until the flush instruction itself arrives. The commit stage 5 may be set in flush mode by the first arriving canceled marked instruction or through reception of the instruction having caused the irregularity (misprediction) which then must have been marked in some way e.g. upon establishing the misprediction. Alternatively the flush mode is reset in the commit stage when a first not canceled marked instruction is received from the dedicated execution unit when it has been in flush mode.

As can be seen the front-end never needs to be flushed and actually no flushing occurs, instructions are merely canceled marked and committed as invalid during the flush mode and there actually are no interruptions since instructions are fetched, decoded etc. also during the flush mode, only they are invalidated at a later stage.

Advantageously, at the same time as detecting in the detecting means 8A that a prediction was incorrect, the branch instruction is again provided to the instruction fetching stage, now not as a predicted branch instruction, but containing the appropriate target address. Preferably it follows directly by the flush instruction.

Figure 2:
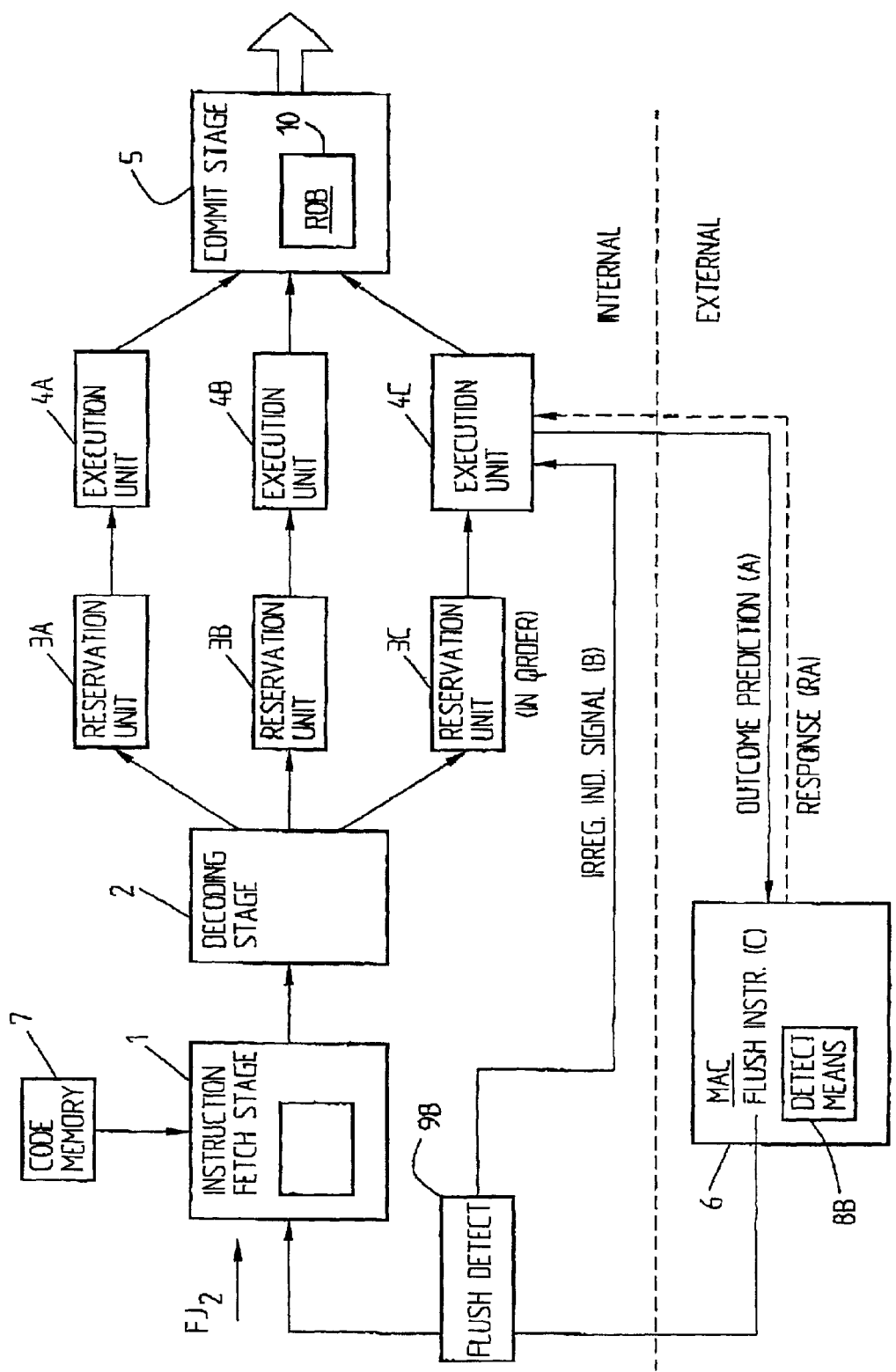
FIG. 2 is a block diagram of a pipelined microprocessor in which an external macrocode-to-microcode translating instruction handling unit is provided and disclosing a second embodiment of the invention.

FIG. 2 is a figure similar to that of FIG. 1 with the difference that an external instruction handling unit MAC 6 is included which e.g. translates instructions in assembler code into microcode. MAC 6 in this case is located outside the pipelined processor and it can also be said to be an instruction fetching unit as the instruction fetching unit of stage 1 with the difference that it translates instructions in macrocode or assembler code to microcode or microcode to microcode which instructions translated subsequently are fetched by the instruction fetching stage 1.

The functioning is the same as that described with reference to FIG. 1 with the difference that the detecting means for establishing whether a prediction/instruction was correct (correctly performed) or not, such as a branch prediction, is comprised by the MAC 6. The execution unit 4C thus, in this case, sends information to detecting means 8B of MAC 6 relating to the outcome (of a prediction) (A). Again, if it is correct, a response (RA) is returned to execution unit 4C whereas if the prediction was incorrect, no response is provided (in this embodiment). Instead a flush instruction is generated which is fetched by the fetching means 1, and, flush detecting means 9B, here provided in association with the MAC 6, sends an irregularity indication signal substantially directly to execution unit 4C for example in the form of a 1-bit signal. Also in this case may of course the flush instruction detecting means 9B be provided separately or associated with instruction fetching stage 1. The irregularity indication signal (B) initiates the flush mode whereas the arrival of the flush instruction $FJ_2$ resets the flush mode when it is received in the execution unit 4C. As in the embodiment described with reference to FIG. 1 the flush detecting means may be superfluous The flush instruction $FJ_1$ may also be introduced elsewhere to the pipeline.

In FIG. 2 is illustrated through a dashed line that only MAC 6 is located externally of the pipelined processor.

In alternative embodiments detection of an instruction irregularity takes place at the commit stage. The outcome is then provided to MAC 6 (FIG. 2) or to the instruction fetching stage (FIG. 1). No response is needed. The commit stage is then set in flush mode. Preferably also the entire execution stage is set in flush mode.

Figure 3:
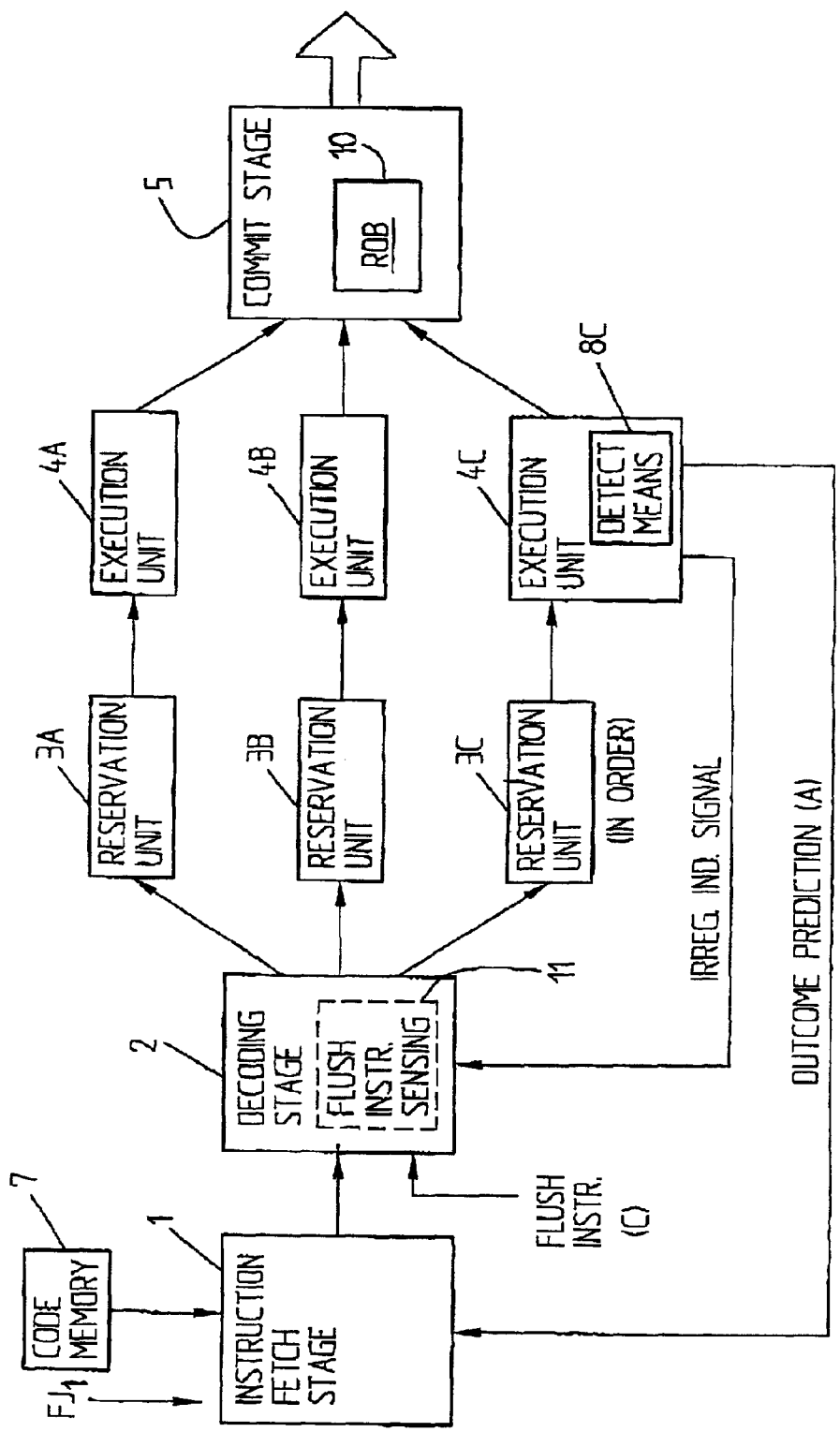
FIG. 3 is a block diagram of a pipelined microprocessor describing a third embodiment of the invention.

In FIG. 3 still another embodiment is illustrated. The different stages and units bear the same reference signs as in the preceding embodiments; it should however be clear that the pipelined microprocessor can differ a lot from what is shown herein. In this embodiment, in addition to the execution unit, also here 4C, handling the instruction irregularity, also the decoding stage 2 is set in flush mode. The detecting means 8C are provided in the execution unit 4C. Upon detecting an instruction irregularity in detecting means 8C, a response is provided to execution unit 4C which generates an irregularity indication signal which is provided to the decoding stage 2 which thus is set in flush mode. Also the execution unit 4C is set in flush mode when the detecting means 8C detects an irregularity, e.g. a misprediction, The generation of the irregularity indication signal, or the detection of an irregularity, also initiates generation of a flush instruction, which here is input to decoding stage 2. The flush instruction may be generated externally or in the instruction fetching stage or in the decoding stage itself. The decoding stage preferably comprises flush instruction sensing means 11 for keeping control of whether the flush instruction has passed or not, such that the decoding stage only is set in flush mode by the irregularity indication signal if the flush instruction has not already passed.

Particularly the instruction having caused the irregularity is marked. When the marked instruction reaches the commit stage, the commit stage is set in flush mode.

All instructions in a stage or in a unit in flush mode are canceled marked. As soon as the flush instruction arrives at a unit/stage in flush mode, the cancel marking causes, and the flush mode is reset.

The outcome (if the branch was mispredicted or not, or, the predicted address) is provided to the instruction fetching unit such that a correctly addressed instruction can be processed through the pipeline. In other aspects is referred to the description of the embodiment of FIG. 1. The embodiment of FIG. 3 differs from that of FIG. 1 mainly in that also the decoding stage can be set in flush mode, and a response is provided to the execution unit bot if an irregularity is established and if no irregularity is established. Further, the detecting means are provided in the execution unit.

Figure 4:
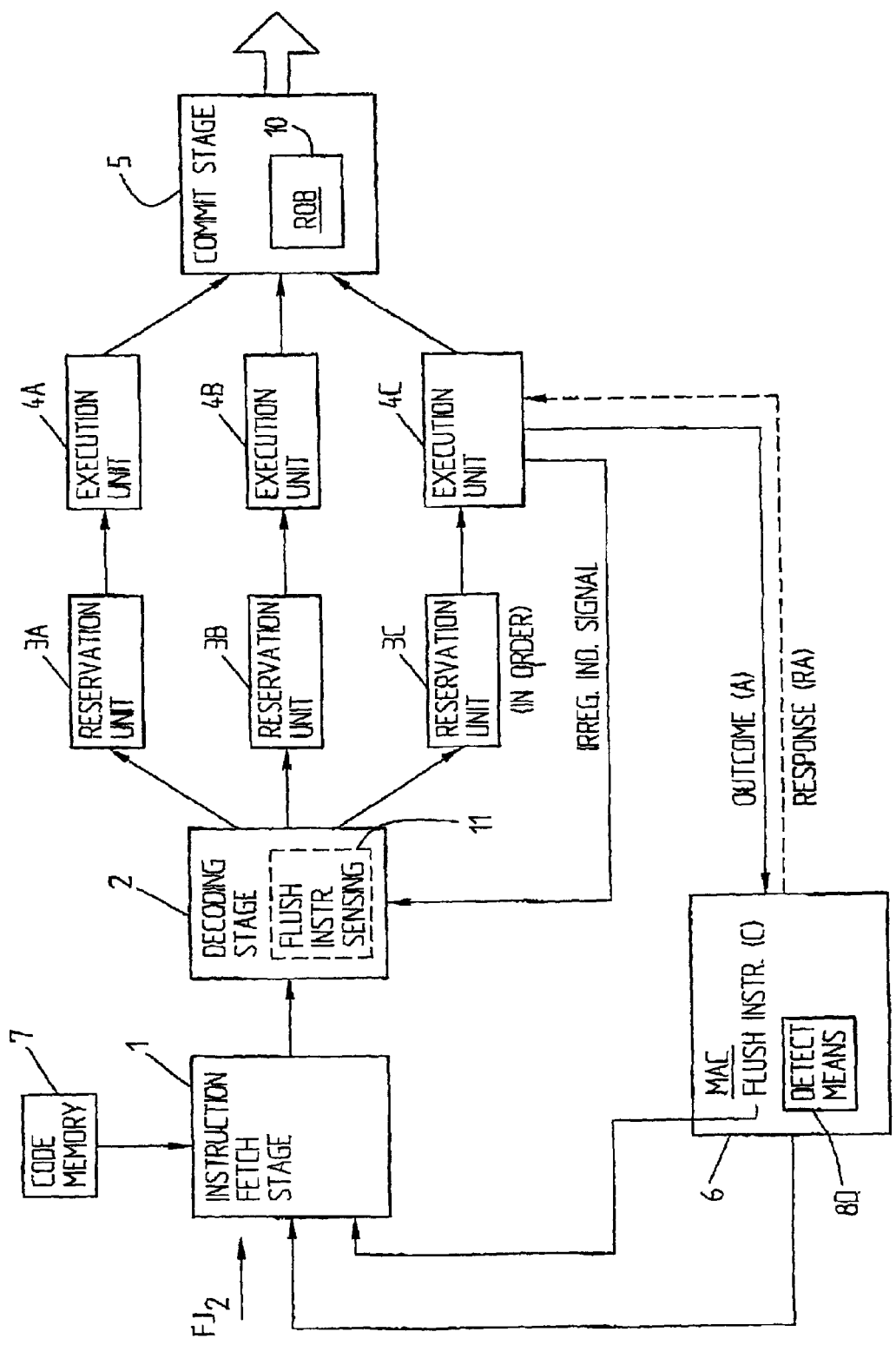
FIG. 4 is a block diagram of a pipelined microprocessor illustrating a fourth embodiment of the invention.

FIG. 4 discloses still another embodiment similar to that described in FIG. 2 but wherein, like in the embodiment of FIG. 3, also decoding stage 2 is set in flush mode upon reception of an irregularity indication signal. The detecting means 8D are provided in MAC 6 (cf. FIG. 2). A response is provided from detecting means 8D when outcome information is provided from execution unit 4C. A response is provided both if it is established that there has been a misprediction or not as opposed to the embodiments of FIG. 1 and FIG. 2 in which no response is provided of it is found that there was a misprediction.

In the embodiment of FIG. 4 a flush instruction is generated in MAC 6 and fetched by fetching stage 1. It may also be generated elsewhere. However, it is input to the pipeline no later than at the decoding stage, The irregularity indication signal is preferably generated in execution unit 4C. Decoding stage 2 is provided with flush instruction sensing means used to keep control of whether the flush instruction has passed or not. If the flush instruction has passed when the irregularity indication signal arrives, the decoding stage will not be set in flush mode.

It should be clear that generally a plurality of conditional branch instructions (or exceptions, interrupts) are processed simultaneously by the pipelined microprocessor. Therefore means have to be provided to identify to which instruction an irregularity indication signal and a flush instruction are related. This may e.g. be performed by the means handling the flush instruction sensing in the decoding stage or elsewhere, or any other appropriate measures may be taken to identify the relationships referred to above.

Instructions, particularly conditional branch instructions, are checked for instruction irregularity in order. One way to achieve this, is through arranging the instructions in order in the respective reservation unit, e.g. branch instructions in reservation unit 3C.

Figure 5A:
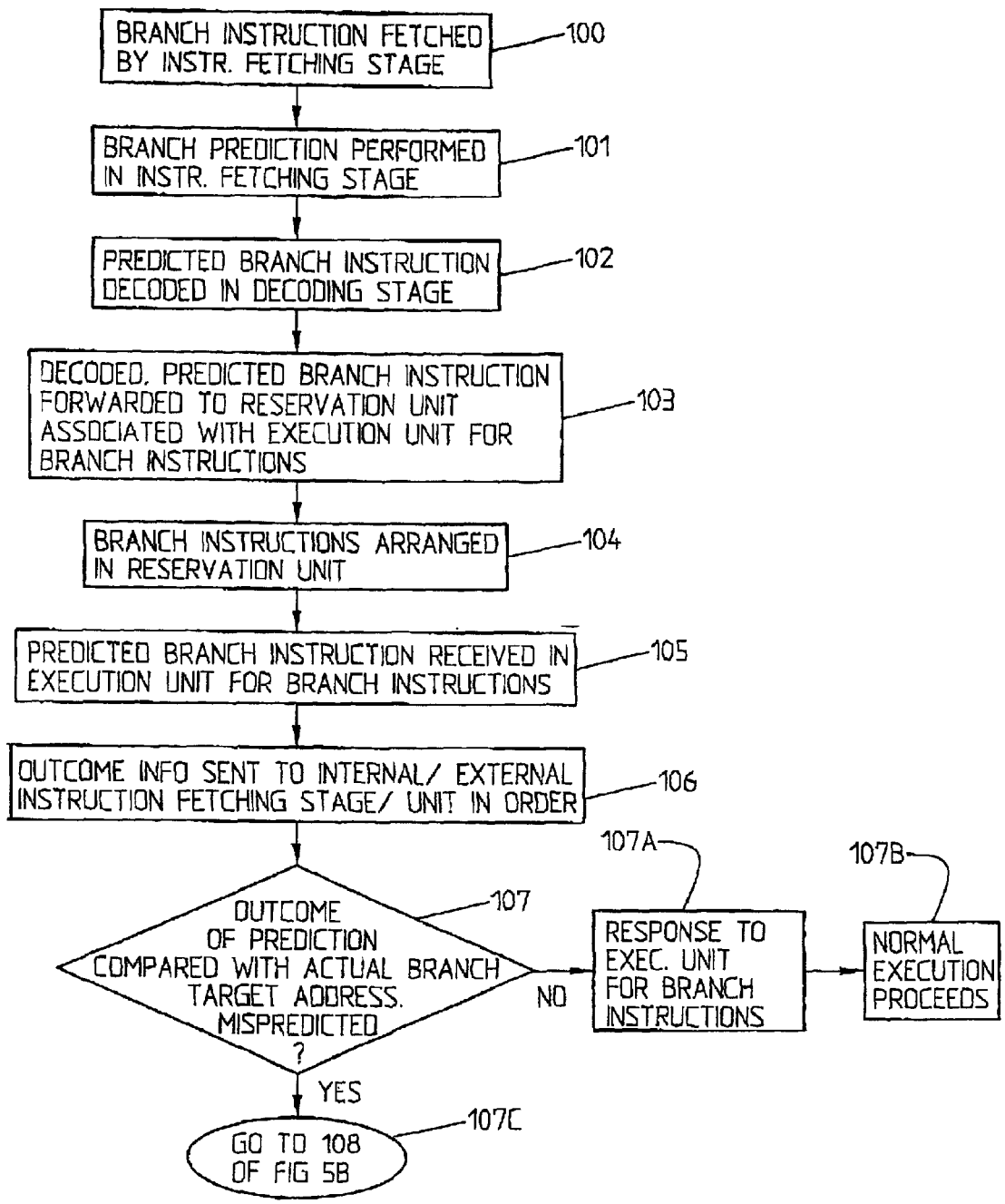
FIGS. 5A,5B show a flow diagram describing the implementation of the inventive concept when a branch has been mispredicted according to the embodiment of FIG. 1.
Figure 5B:
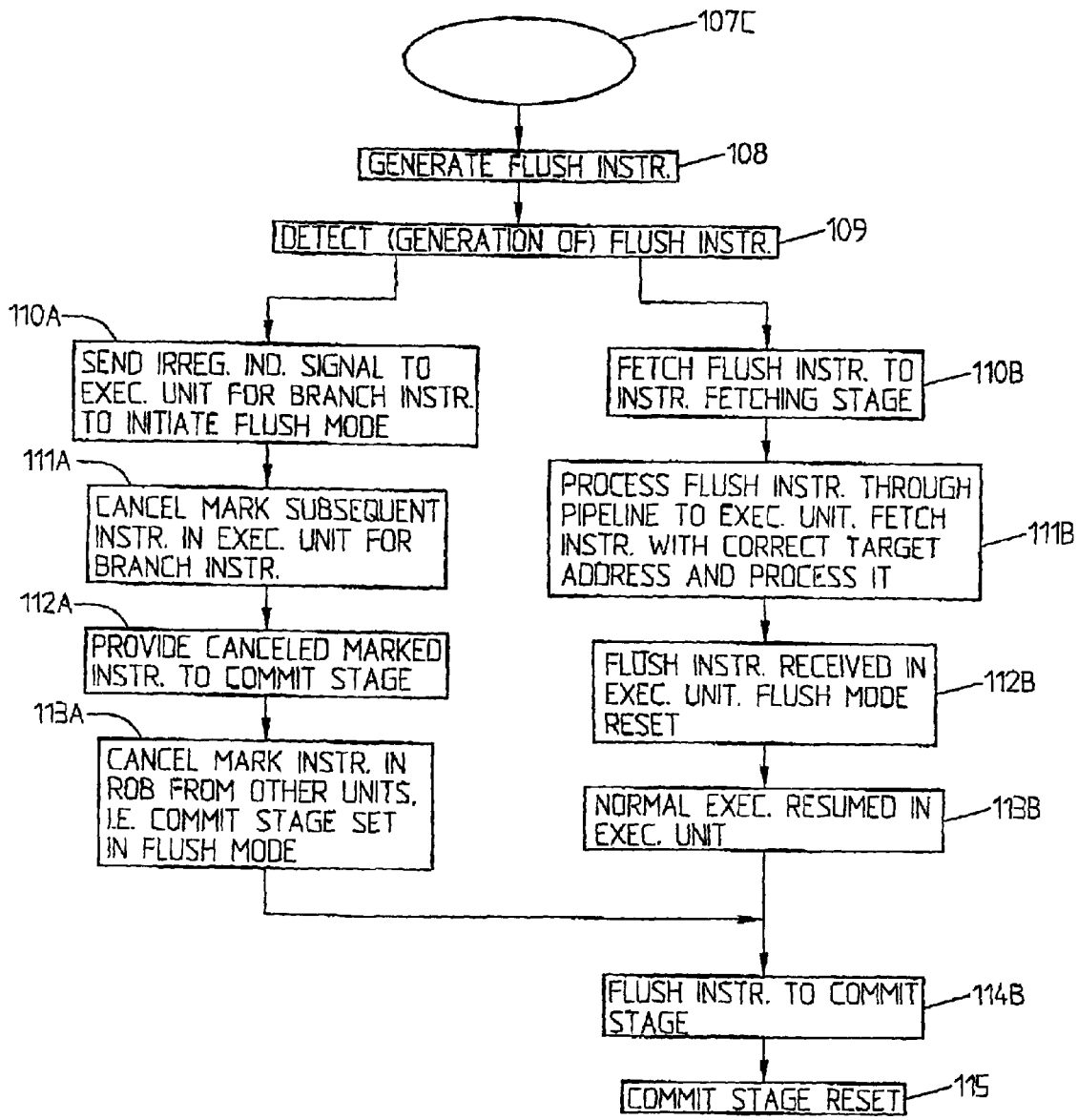

FIG. 5A (continuation in FIG. 5B) is a simplified flow diagram illustrating the processing when a conditional branch instruction is fetched by the instruction fetching stage 1. In FIG. 5A it is thus supposed that a branch instruction is fetched by the instruction fetching stage, 100. A branch prediction is carried out in the instruction fetching stage, i.e. it is predicted whether the branch is taken or not, 101. The predicted branch instruction is then decoded in the decoding stage, 102, using the predicted branch target address. The decoded, predicted branch instruction is thereupon forwarded to the reservation unit associated with an execution unit "dedicated" for handling branch instructions, 103. Thus, in this embodiment one execution unit is dedicated for handling (at least) such instructions whereas other execution units are used for handling other types of instructions.

In the reservation unit branch instructions are provided in order and the concerned branch instruction is thus provided in its appropriate place in a queue or similar, 104. When its turn has come, the predicted branch instruction is forwarded to, and executed in, the "dedicated" execution unit, 105. When this execution unit detects that it is a conditional branch instruction, for which a prediction has been done, the address information of the predicted branch target is transferred to either the internal (handling microcode) or external (e.g. handling macrocode) instruction fetching stage (unit), 106, depending on which unit keeps the information about the actual, calculated branch target address Alternatively information is provided that states if the prediction was correct or not, and such that the correct address can be calculated, found in a table or similar.

In an alternative implementation branch instructions are not provided in under in step 104, but the sending on information (step 106) is done in order for the instructions.

Advantageously detecting means are provided which are responsible for detecting a misprediction. Above it was supposed that said detecting means was provided either in the internal or the external instruction fetching stage unit; of course such means may also be provided externally of either thereof. In the detecting means, or misprediction detecting means, the outcome of the prediction may be compared with the actual branch target address, 107. Of course the misprediction may be established also in other manners than through a comparison, or information about the outcome, meaning misprediction or not, may be provided.

If it is established that the prediction was correct, i.e. that there was no misprediction, a response of some kind is sent to the dedicated execution unit, 107A, and the dedicated execution unit proceeds with normal execution, 107B. If however it was established that there had been a misprediction, it is proceeded with step 108 of FIG. 5B.

Thus, when a misprediction is detected, a flush instruction is generated, 108. The generation may be performed by the misprediction detecting means or by separate means, or in any other appropriate way, e.g. in the instruction fetching stage or in the decoding stage. The flush instruction, or the generation of the flush instruction, is detected by flush detecting means, 109, (in this embodiment) which means may be provided in the internal or external fetching stage/ units, in association with the misprediction detecting means or separately.

When the flush instruction somehow is detected, a irregularity indication signal is sent to the "dedicated" execution unit to set it in flush mode, 110A. The signal is sent substantially directly to the "dedicated" execution unit. Substantially simultaneously as the irregularity indication signal is sent, the flush instruction is fetched or input to the instruction fetching stage (here) at the head of the pipeline, 110. The irregularity indication signal received in the "dedicated" execution unit initiating the flush mode, has as a consequence that in the dedicated execution unit subsequent instructions are canceled marked for example through a bit being adhered to the instructions or in any appropriate manner, 111. It is sufficient to do it with the subsequent instructions, since in the reservation unit provided to the dedicated execution unit, the instructions are kept in order (in one embodiment). The canceled marked instructions are subsequently provided to the commit stage, 112A, and when a canceled marked instruction is received in the commit stage, also the commit stage is set in flush mode and it provides for cancel marking instructions received from other execution units which are provided in a reorder buffer comprised by the commit stage or associated with the commit stage, 113A Alternatively, not shown in relation to FIGS. 5A, 5B, the instruction having caused the irregularity may be marked accordingly, and when it is received/handled in the commit stage, the commit stage is set in flush mode. The flush instruction fetched by the instruction fetching stage is processed as a conventional instruction through the pipeline towards the "dedicated" execution unit. Since the correct target address of the initially mispredicted branch instruction now is available, also this instruction is fetched and processed in a conventional manner, 111. When the flush instruction eventually arrives in the "dedicated" execution unit, the flush mode is reset, 112B. Normal execution is then resumed in the execution unit and the "first" not canceled marked instruction is again received from the "dedicated" execution in the commit stage. When normal execution is resumed in the "dedicated" execution unit this is experienced in the commit stage, and also the commit stage is reset. Alternatively the flush instruction is received also in the commit stage, 114B, which gets as a consequence that the commit stage also is reset, 115.

Figure 6A:
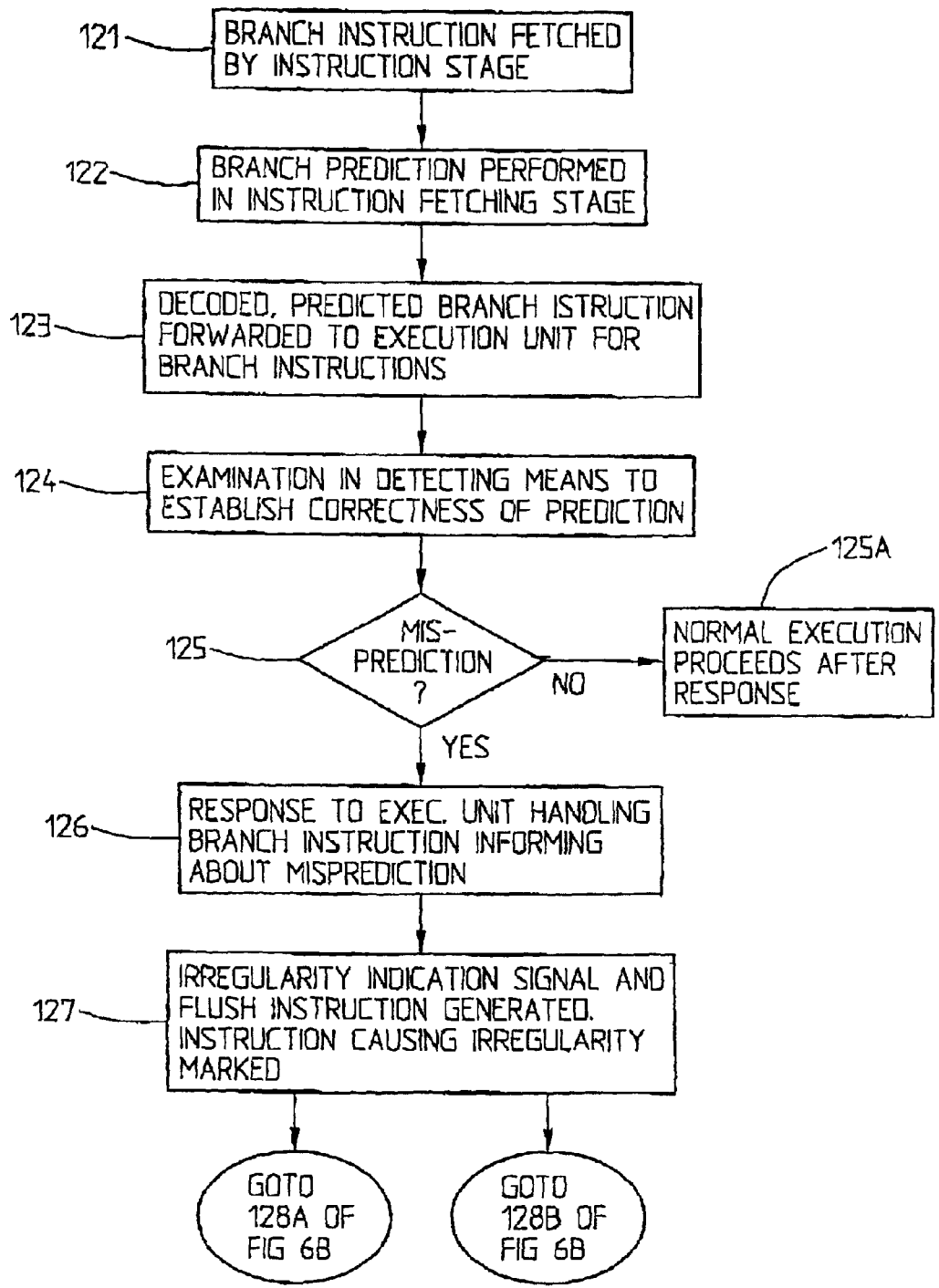
FIGS. 6A,6B show a flow diagram describing the implementation of the inventive concept when a branch has been mispredicted substantially according to the embodiment of FIG. 3.

FIG. 6A is a flow diagram describing one example on a procedural flow when in addition to the concerned execution unit also the decoding stage is set in flush mode. Like in FIG. 5A a branch instruction, meaning a conditional branch instruction (as in the other embodiments) is fetched by the instruction fetching stage (or a unit of said stage if it comprises several units), 121. A branch prediction is performed in the instruction fetching stage, 122, and decoding is performed in the decoding stage (not shown in this flow diagram). The decoded predicted branch instruction is then forwarded to an/the execution unit for branch instructions, 123. The branch instruction may be ordered in a reservation unit, if such is provided. According to one implementation branch instructions are provided in order in the reservation unit. This is not compulsory; that instructions are checked for an irregularity in order may also be provided for in other ways. Subsequently, however, it is examined in detecting means if the prediction was correct, 124, or if it was a misprediction, 125. If it was not a misprediction, normal execution proceeds after the provision of a response to the execution unit handling the instruction (also called the "dedicated" execution unit) by the detecting means. The detecting means may be provided in the "dedicated" execution unit or elsewhere, e.g. externally of the pipeline. If it was detected that it actually was a misprediction, a response also in this case is provided to the "dedicated" execution unit, 126.

Figure 6B:
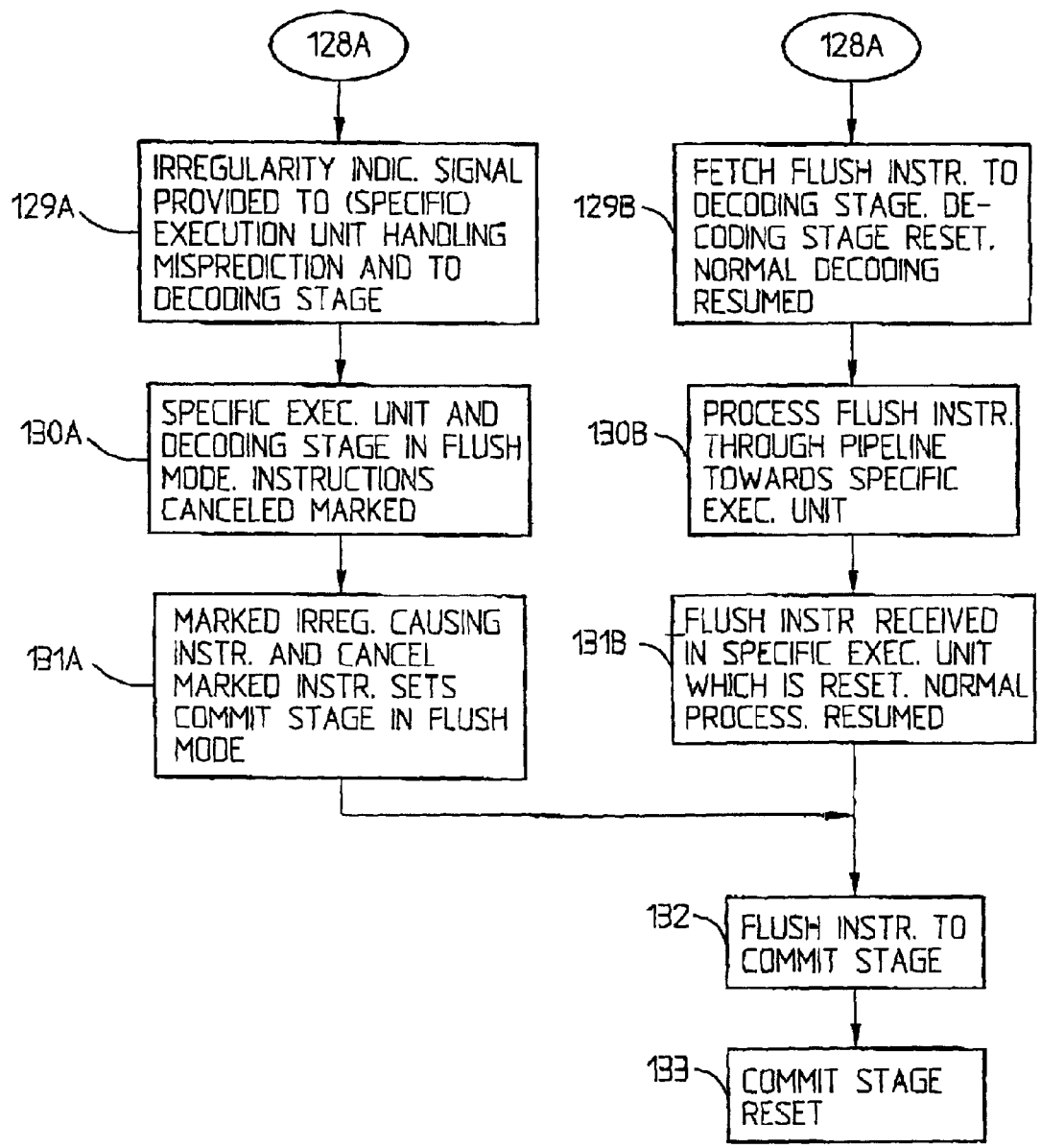

An irregularity indication signal is then generated, preferably in the "dedicated" execution unit. Substantially simultaneously a flush instruction is generated, i.e. by instruction fetching stage, or decoding stage. Further the instruction having caused the irregularity is marked, 127. The flow can then be said to follow two paths, starting with 128A and 128B respectively of FIG. 6B. The irregularity indication signal is provided to the specific or dedicated execution unit handling the misprediction (even if it is generated in detecting means provided therein) and to the decoding stage. Said execution unit and the decoding stage are then set in flush mode, and all instructions handled by said unit/stage are canceled marked, 130A.

The commit stage is set in flush mode either upon reception of the instruction marked for having caused the irregularity or by the first received canceled marked instruction, 131A.

The other branch generally relates to the flush instruction. It is fetched to the decoding stage, which then is reset and normal decoding is resumed. (It may also be fetched at an earlier stage, by the instruction fetching stage, 129B.

The flush instruction is then processed towards the specific execution unit (specific is, as referred to earlier, the unit handling an instruction irregularity), 130B.

When the flush instruction is received in the specific execution unit (or here the dedicated execution unit), the latter is reset and normal processing is resumed, 131B, and of course any cancel marking ceases. When the flush instructions reaches the commit stage, 132, the commit stage is reset, 133.

Figure 7:
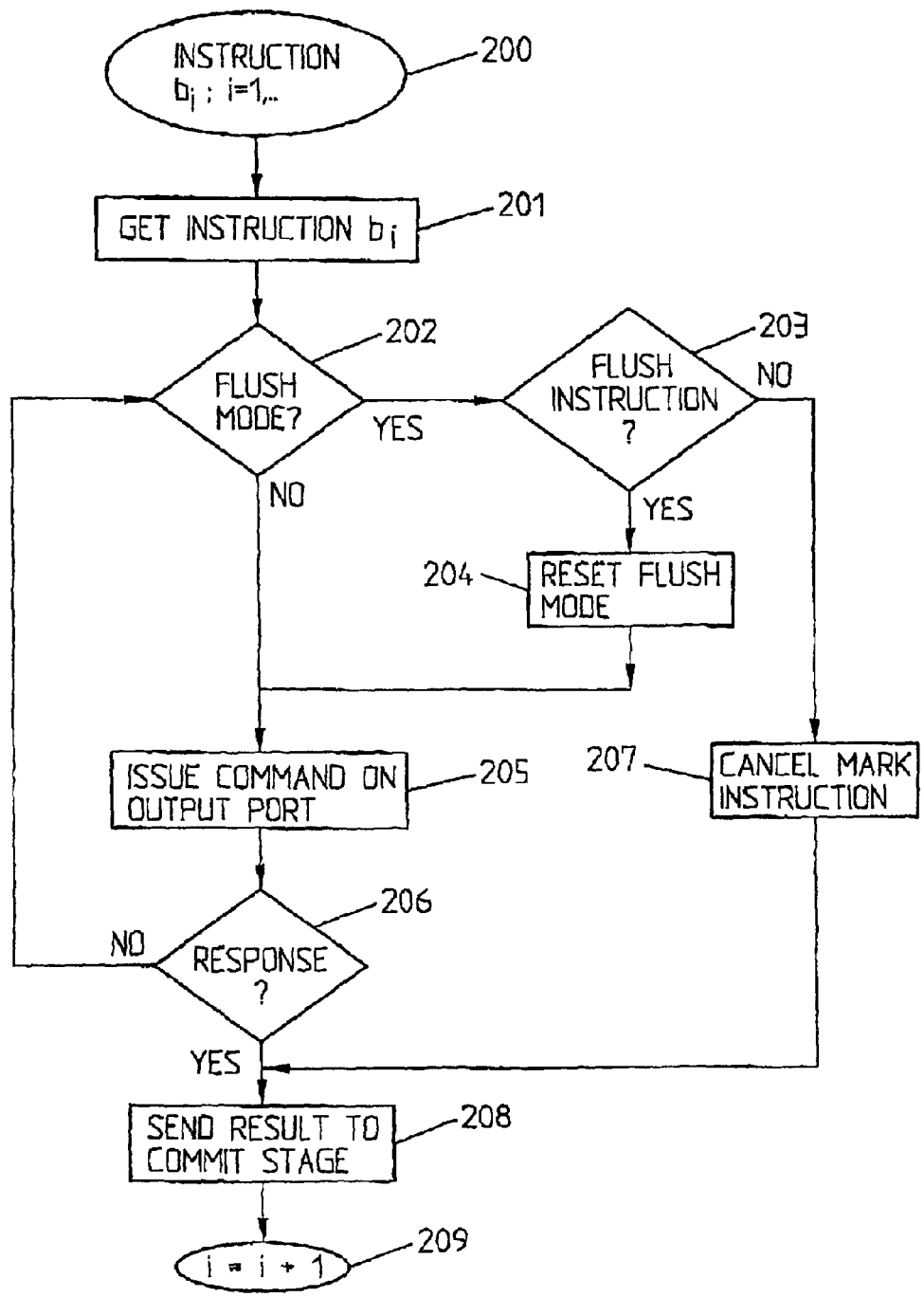
FIG. 7 is a flow diagram describing the flow in an execution unit handling branch instructions according to an embodiment as described in FIG. 1.

FIG. 7 shows an embodiment of the procedure in the execution unit handling an instruction irregularity in the form of a misprediction. In one implementation the execution unit is a hardware unit which handles branch instructions. It should be clear that this dedicated execution unit normally does not exclusively handle branch instructions but it is here simply denoted a dedicated execution unit since it handles all branch instructions. The procedure to be described is gone through for every received instruction. Thus, it is supposed that instruction $b_i$, wherein i=1, . . . , is considered, 200. When the instruction $b_i$, which includes, in one embodiment, an instruction which is canceled marked is received in the dedicated execution unit, 201, it is examined whether the unit is in flush mode or whether the flush mode should be initiated, 202. If yes, it is examined whether it is a flush instruction, 203. If yes, then the flush mode is reset, 204. If not, either the execution unit processes in flush mode or a flush mode is to be initiated, which means that the instruction is to be canceled marked, 207. The canceled marked instruction, or the result, is then sent to the commit stage as a dummy result or a canceled instruction, 208. Thereupon is proceeded with the subsequent instruction, 209.

If however the result of the step above referring to the examination whether in flush mode, 202, was negative, a command is issued on the output port, to an external unit, 205. A response is awaited, 206, and if it arrives, the instruction of the predicted branch was correct, and the result is sent to the commit stage, 208, and it is proceeded with the subsequent instruction. If however no response is received from an external unit, it is again examined whether in flush mode, 202, etc.

Figure 8:
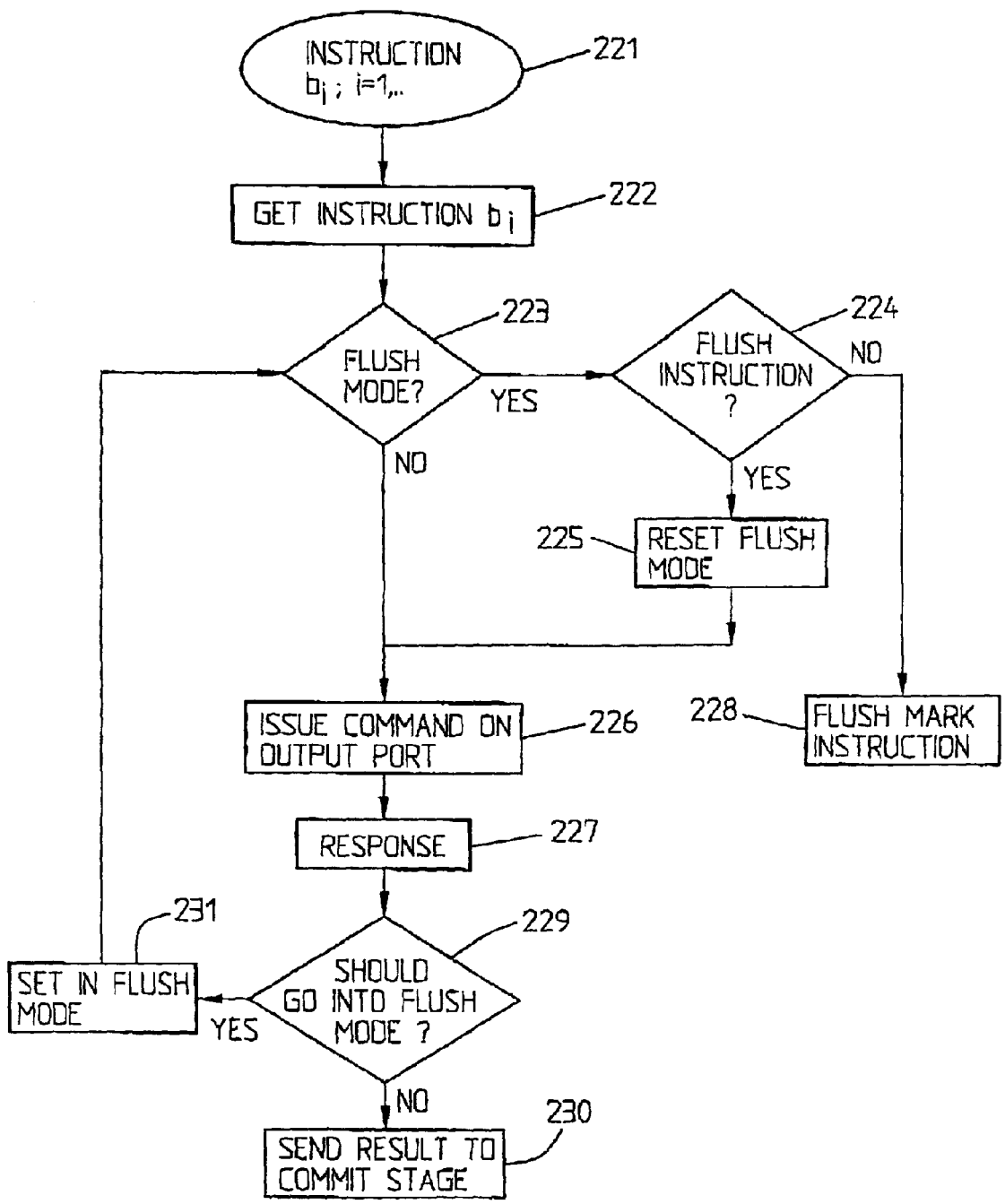
FIG. 8 is a flow diagram describing the flow in an execution unit handling branch instructions according to an embodiment as described in FIG. 3.

FIG. 8 is a flow diagram describing the flow in the "dedicated" execution unit similar to that of FIG. 7, but for an embodiment as in FIG. 3.

Steps 221–226 substantially correspond to steps 200–205 of FIG. 7, and will therefore not be further described. However, according to the embodiment of FIG. 8, a response is provided to the execution unit irrespectively of whether it is a positive or a negative response. If the detecting means actually are provided in the execution unit itself, a response is also provided. Then is examined if the executed unit in question should go into flush mode or not, 229. If not, the result is sent to the commit stage, 230. If yes, the execution unit is set in flush mode, 231, and it is returned to step 223 (cf. 202 of FIG. 7) in which it is checked whether the execution unit is in flush mode or not, and the procedure is repeated.

Figure 9:
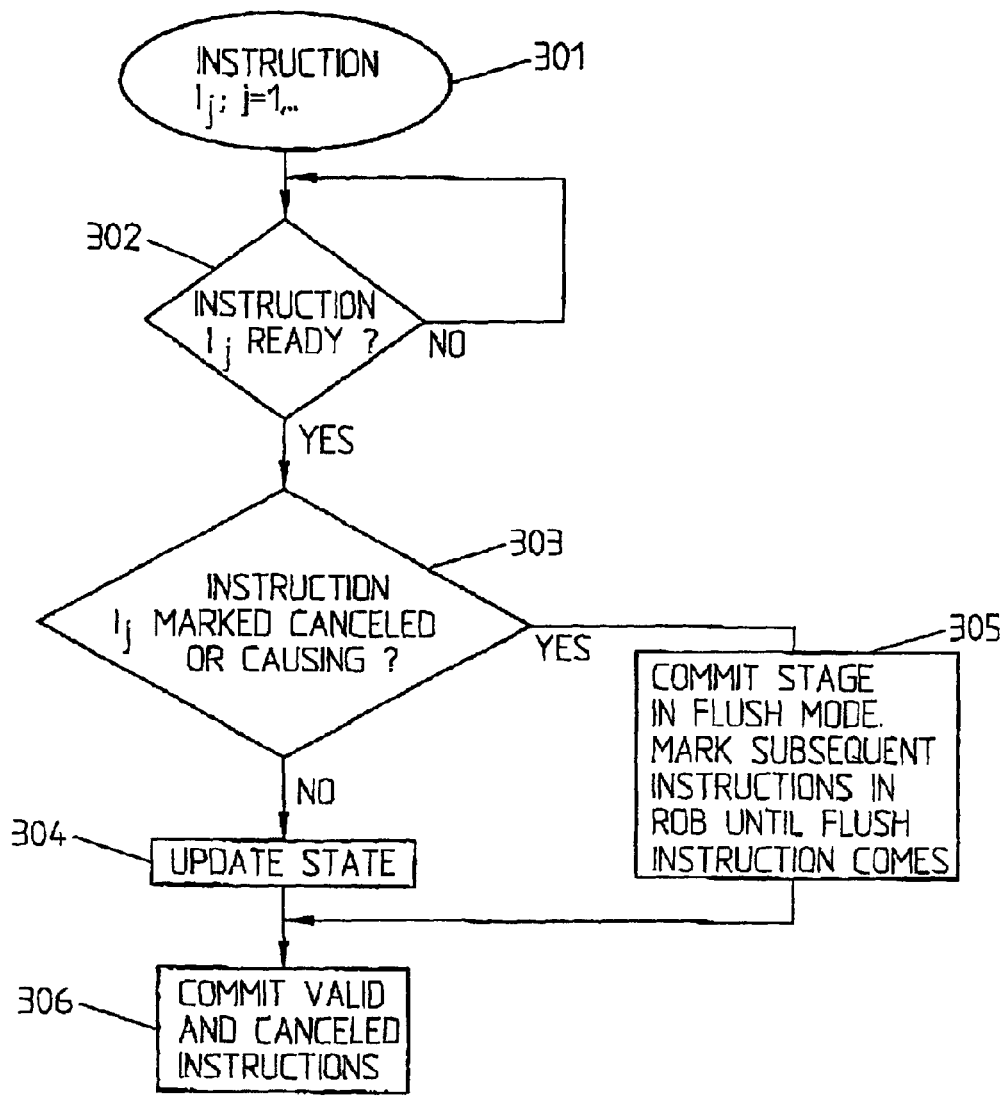
FIG. 9 is a flow diagram describing the handling at the commit stage, and FIG. 10 in a simplified manner discloses the procedure in the reorder buffer comprised by the commit stage when a conditional branch instruction has been mispredicted.

FIG. 9 is a simplified flow diagram illustrating the procedure in the commit stage. It is supposed that an instruction $I_j$ is handled, 301. Instructions are here denoted $I_j$ since it relates to any instruction and not just instructions handled in the "dedicated" execution unit which were denoted $b_i$ (of FIG. 4). Subsequently it is examined if instruction $I_j$ is ready, 302, if not, it will be examined again. If however it is established that $I_j$ is ready, it is established whether instruction $I_j$ is canceled marked, 303. It may also be checked if it is the instruction marked as being the cause of the irregularity. If not, the state is updated in a conventional manner, 304, and the instruction is committed and output, 306. In this figure the updating operation and the commit operation have been divided into two steps although the commit operation can be said to actually include the updating state operation; this is so for reasons of separating between canceled marked and not canceled marked instructions.

Thus, if it was settled that the instruction $I_j$ was canceled marked in step 303 above, or if instruction $I_j$ is marked as the instruction that caused the irregularity, the commit stage is set in flush mode which means that subsequent instructions in the ROB are canceled marked during the commit stage. Instructions of concern in this case are the instruction from other execution units than the one handling the irregularity. Canceled marked instructions can also be said to be committed but they are invalid or dummy instructions and do not involve any state updating. When the flush mode is reset in the "dedicated" execution unit, this is also detected in the commit stage which then also is reset, this is however not explicitly illustrated in this flow diagram, but only instructions (in order in ROB) prior to flush instruction are canceled marked. Alternatively the commit stage is reset upon reception of the flush instruction, i.e. then ceases the cancel marking of instructions.

Figure 10:
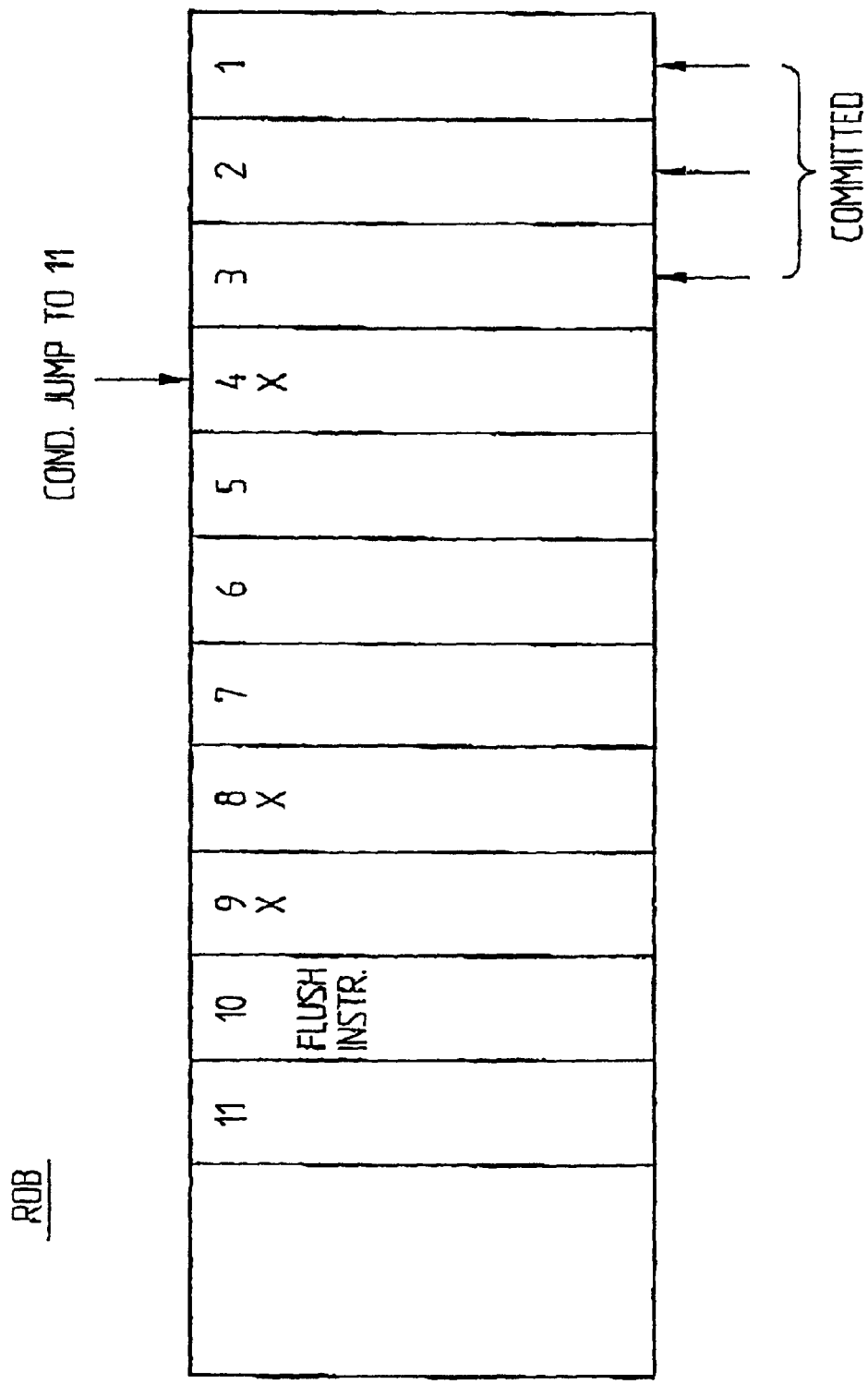

FIG. 10 illustrates the reorder buffer ROB in a simplified manner. It is here supposed that instruction address 4 is a conditional jump to address 11. However, it was predicted that the jump was not to be taken. If this was a misprediction, instruction 4 will not be received yet, since there is no response (in one embodiment). Instruction 4 is then canceled marked in the execution unit. Subsequent instructions are canceled marked either in the dedicated execution unit or in ROB if they come from other execution units. It is to be noted that in some embodiments cancel marking may also be performed in the decoding stage. 10 indicates the actual address of the flush instruction. It does not arrive until the flush instruction, which resets the flush mode, has been received in the dedicated execution unit. This instruction is not marked and for subsequent instructions normal processing is resumed. All other instructions being reserved an address between 4 and 11 are flush marked when they are ready.

It should be clear that the invention is not limited to the explicitly illustrated embodiments but that it can be varied in a number of ways without departing from the scope of the appended claims.

What is claimed is:

1. A pipelined microprocessor for processing instructions, comprising at least one pipeline comprising an instruction fetching functional stage, an instruction decoding functional stage, an execution functional stage comprising a number of execution units, and a commit functional stage comprising or being associated with a reorder buffer, wherein the microprocessor further includes detecting means for detecting instruction irregularities, such that when an instruction irregularity is detected, an irregularity indication and a flush instruction are generated, and the irregularity indication is used to initiate a flush mode, whereas the flush instruction, when received in a functional stage or unit set in flush mode, resets the flush mode in said functional stage/unit.

2. The pipelined microprocessor according to claim 1, wherein the detecting instruction irregularities at the execution functional stage.

3. The pipelined microprocessor according to claim 1, wherein the detecting means are provided for detecting instruction irregularities at the commit functional stage.

4. The pipelined microprocessor according to claim 1, wherein the irregularity indication at least initiates the flush mode in the execution unit of the execution functional stage handling the instruction irregularity.

5. The pipelined microprocessor according to claim 3, wherein the irregularity indication at least initiates the flush mode in the commit functional stage.

6. The pipelined microprocessor according to claim 5, wherein the execution units of the execution functional stage are set in flush mode by the irregularity indication.

7. The pipelined microprocessor according to claim 4, wherein the irregularity indication is also provided to the decoding functional stage to set the decoding functional stage in flush mode.

8. The pipelined microprocessor according to claim 1, wherein the instruction irregularity is provided with an irregularity marking.

9. The pipelined microprocessor according to claim 1, wherein the instruction irregularity is provided with an irregularity marking and the commit functional stage is set in flush mode upon reception/committing of the instruction irregularity when not already in flush mode.

10. The pipeline microprocessor according to claim 1, wherein all instructions processed by a unit/functional stage in flush mode are provided with a cancel marking, unless already marked, and said cancel marking is used to indicate to units/functional stages, in front of the unit/functional stage that the flush mode should be set.

11. The pipelined microprocessor according to claim 1, wherein the flush instruction is processed through at least some of the functional stages of the pipeline.

12. The pipelined microprocessor according to claim 1, wherein at least branch instructions are checked to establish if they comprise an instruction irregularity in the same order as they where provided to the decoding functional stage.

13. The pipelined microprocessor according to claim 1, wherein a reservation functional stage comprising a number of reservation units is provided preceding the execution functional stage and at least some of the reservation units of the reservation functional stage process(es)/arrange(s) instructions in order.

14. The pipelined microprocessor according to claim 1, wherein no command is issued to external units from an execution unit handling an instruction irregularity during the flush mode.

15. The pipelined microprocessor according to claim 1, wherein the pipelined microprocessor is adapted to handle instruction irregularities comprising exceptions and/or interrupts (mis)predicted branch instructions.

16. The pipelined microprocessor according to claim 15, wherein the pipelined microprocessor is adapted to operate as a speculative out-of-order processor that predicts whether a conditional branch is to be taken or not.

17. The pipelined microprocessor according to claim 13, wherein branch instructions are provided in order in a reservation unit communicating with a execution unit handling branch instructions.

18. The pipelined microprocessor according to claim 16, wherein a conditional branch instruction is predicted at the instruction fetching functional stage, information about the outcome is provided from the execution unit handling the predicted branch instruction to the detecting means for establishing whether the prediction was correct or not, and a response is returned to said execution unit if the prediction was correct.

19. The pipelined microprocessor according to claim 18, wherein if it is established that a prediction was incorrect, a response is provided to the execution unit, the response providing for the generation of the irregularity indication (signal) from the detecting means.

20. The pipelined microprocessor according to claim 19, wherein the flush instruction is generated in the execution unit.

21. The pipelined microprocessor according to claim 19, wherein the flush instruction is generated at the decoding functional stage, at the instruction fetching functional stage, or externally of the pipeline.

22. The pipelined microprocessor according to claim 1, wherein the detecting means operate in association with the execution unit or the commit functional stage.

23. The pipelined microprocessor according to claim 1, wherein the detecting means is provided separately or externally of the pipeline.

24. The pipelined microprocessor according to claim 23, wherein when the flush instruction is generated, an irregularity indication is sent to the execution functional stage indicating the provision of the flush instruction and to initiate the flush mode in the execution unit handling the instruction irregularity.

25. The pipelined microprocessor according to claim 17, wherein the detecting means establishing the correctness of a prediction generates the flush instruction if the prediction was incorrect.

26. The pipelined microprocessor according to claim 17, wherein the detecting means are comprised in the instruction fetching functional stage.

27. The pipelined microprocessor according to claim 17, wherein the detecting means are comprised by instruction handling means translating macrocode or assembler code to microcode or microcode to microcode for input to the instruction fetching functional stage.

28. The pipelined microprocessor according to claim 27, wherein additional flush instruction detection means are associated with the instruction fetching functional stage or the instruction handling means for detecting the generation of a flush instruction or a misprediction and sending the irregularity indication to the execution unit handling the predicted branch instruction.

29. The pipelined microprocessor according to claim 1, wherein during flush mode, all passing instructions are ignored until the arrival of the flush instruction resetting the flush mode.

30. A method of processing instructions in a pipelined microprocessor comprising at least one pipeline comprising an instruction fetching functional stage, an instruction decoding functional stage, an execution functional stage and a commit functional stage, the method comprising the steps of:

detecting an instruction irregularity at the execution functional stage or at the commit functional stage;

providing an irregularity indication to set at least the execution unit handling the instruction irregularity or the commit functional stage in flush mode;

generating a flush instruction;

inputting the flush instruction to the pipeline;

cancel marking instructions processed in a unit/functional stage in flush mode; and resetting the flush mode in each unit/functional stage in flush mode upon reception of the flush instruction.

31. The method according to claim 30, further comprising the step of:

marking the instruction causing the irregularity when detecting the instruction irregularity.

32. The method according to claim 31, further comprising the step of:

setting the decode functional stage in flush mode through initiation by said irregularity indication.

33. The method according to claim 32, further comprising the step of:

setting the commit functional stage in flush mode, wherein the flush mode in the commit functional stage is initiated either by the irregularity indication or when committing the irregularity marked instruction.

34. The method according to claim 30, wherein the step for detecting an instruction irregularity comprises:

communicating information about the instruction to the instruction fetching functional stage keeping actual address information about the instruction;

verifying the correctness of the outcome of the instruction;

if no instruction irregularity is established, then sending a response to the execution unit; and if the instruction irregularity is true, detecting that no response is received after a given time interval, making the execution unit aware of the instruction irregularity, and generating a flush instruction.

35. The method according to claim 30, wherein the instruction irregularity is a mispredicted branch prediction and the detection step comprises:

providing information to the instruction fetching functional stage about the outcome of the branch prediction including an address of the predicted branch target;

comparing the predicted branch target address with the actual branch target address; and if they are not the same, generating a flush instruction.

36. The method according to claim 30, wherein the step of detecting an instruction irregularity comprises:

predicting if an instruction might cause an irregularity;

attaching the result of the predicted outcome to said instruction;

processing the instruction in an execution unit and evaluating if the instruction caused an irregularity;

detecting if the prediction was correct or not;

generating an irregularity indication in the execution unit handling the instruction irregularity or in the commit functional stage, if the prediction was incorrect; and proceeding with unaffected processing when the prediction is correct.

37. The method according to claim 30, comprising the additional step of:

providing instructions, in order, in at least some reservation unit(s) that to precede at least an execution unit handling branch instructions.

* * * * *

UNITED STATES PATENT AND TRADEMARK OFFICE
CERTIFICATE OF CORRECTION

PATENT NO. : 6,807,621 B2
APPLICATION NO. : 09/965961
DATED : October 19, 2004
INVENTOR(S) : Strombergson et al.

It is certified that error appears in the above-identified patent and that said Letters Patent is hereby corrected as shown below:

In Column 1, Line 26, delete "bold" and insert -- hold --, therefor.

In Column 9, Line 4, delete "riot" and insert -- not --, therefor.

In Column 12, Line 15, delete "110." and insert -- 110B. --, therefor.

In Column 12, Line 20, delete "111." and insert -- 111A. --, therefor.

In Column 12, Line 40, delete "111." and insert -- 111B. --, therefor.

Signed and Sealed this

Thirtieth Day of October, 2007

JON W. DUDAS
*Director of the United States Patent and Trademark Office*